United States Patent [19]

Vuorenmaa

[11] Patent Number: 5,046,695
[45] Date of Patent: Sep. 10, 1991

[54] DEVICE INTENDED FOR ATTACHMENT TO THE OUTER SURFACE OF A CYLINDRICAL OBJECT

[75] Inventor: Pauli O. Vuorenmaa, Veppebyvägen 8, S-198 00 Bålsta, Sweden

[73] Assignee: Pauli Vuorenmaa, Bålsta, Sweden

[21] Appl. No.: 473,991

[22] PCT Filed: Nov. 7, 1988

[86] PCT No.: PCT/SE88/00600

§ 371 Date: Apr. 25, 1990

§ 102(e) Date: Apr. 25, 1990

[87] PCT Pub. No.: WO89/04428

PCT Pub. Date: May 18, 1989

[30] Foreign Application Priority Data

Nov. 5, 1987 [SE] Sweden ............................ 8704318
Mar. 4, 1988 [SE] Sweden ............................ 8800792

[51] Int. Cl.$^5$ ............................................. A47B 96/06
[52] U.S. Cl. ................................... 248/230; 160/399; 160/402; 403/371
[58] Field of Search ............... 403/367, 368, 371; 160/399, 401, 402; 248/231.3, 316.2, 316.3, 231.2, 230, 229, 225.31

[56] References Cited

U.S. PATENT DOCUMENTS

| | | | |
|---|---|---|---|
| Re. 20,074 | 8/1936 | Stahl | 403/371 |
| 299,359 | 5/1884 | Doty | 160/402 |
| 740,684 | 10/1903 | Needham | 160/402 X |
| 808,414 | 12/1905 | Weilert | 160/402 X |
| 2,009,318 | 7/1935 | Highfield | 403/371 X |
| 2,136,861 | 1/1937 | Norris et al. | |
| 2,166,458 | 7/1939 | Berndt et al. | 403/371 X |
| 2,206,373 | 7/1940 | Stieber | 403/368 |
| 2,212,953 | 8/1940 | Popp et al. | 248/230 X |
| 2,350,235 | 5/1944 | Johnson | 160/399 X |
| 3,025,089 | 3/1962 | Ramsden | 248/230 X |
| 3,058,386 | 10/1962 | Morrow | 403/368 X |
| 3,074,239 | 1/1963 | Mustard | 248/230 X |
| 3,458,234 | 7/1969 | Bates | 248/230 X |
| 3,721,463 | 3/1973 | Attwood et al. | 248/231.2 X |
| 4,615,532 | 10/1986 | Biller et al. | 403/371 X |
| 4,662,134 | 5/1987 | Illgner | 403/371 X |
| 4,819,969 | 4/1989 | Williams | 403/368 X |

Primary Examiner—Gary L. Smith
Assistant Examiner—Suzanne L. Dino

[57] ABSTRACT

A device which is externally fitted to a rod-like object has an inner tubular member and an external, rigid tubular member. Each tubular member has a longitudinally extending opening through which the rod-like object can be inserted. The internal tubular member has a conically narrowing outer peripheral surface and an inner surface whose shape approximately corresponds to the peripheral surface of the rod-like object. The external tubular member has a conically shaped inner surface corresponding to the outer surface of the internal tubular member. By axially displacing the inner and outer tubular members, the device will be firmly clamped onto the rod-like object. The device can be used to clamp cloth or fabric to a tubular stand or frame structure. Also suspension devices and connecting devices such as hooks and legs can be attached on the device.

18 Claims, 2 Drawing Sheets

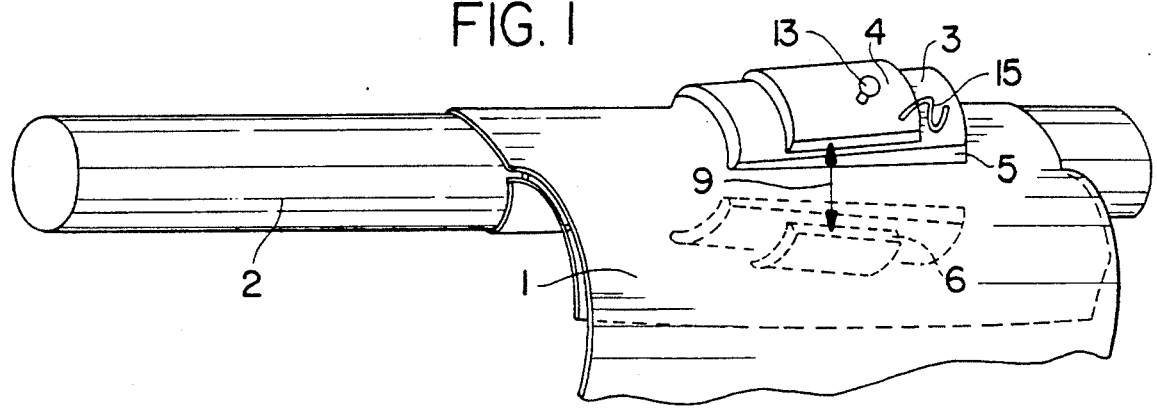
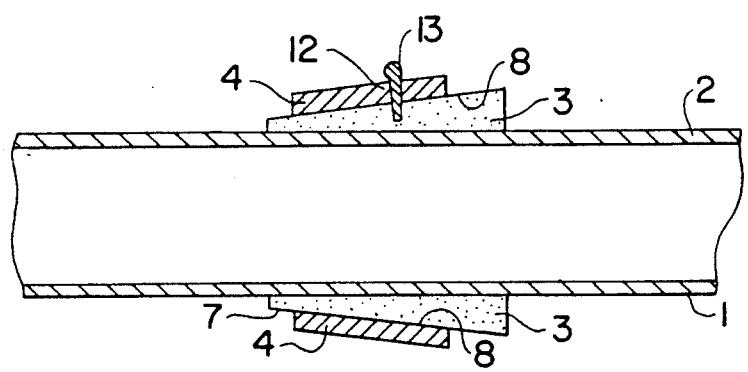
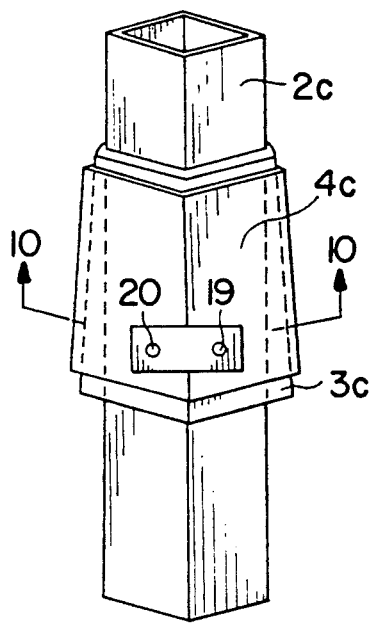

DEVICE INTENDED FOR ATTACHMENT TO THE OUTER SURFACE OF A CYLINDRICAL OBJECT

FIELD OF THE INVENTION

The present invention relates to a device intended for attachment to the outer surface of a cylindrical object.

DESCRIPTION OF THE BACKGROUND ART

There is often found a need to secure articles to and/or hang articles on tubular or rod-like cylindrical objects. The word cylindrical as used here shall be interpreted in its widest meaning, and can be understood to refer to any configuration from triangular, square and pentagonal to a multi-sided, circular-cylindrical, elliptical, pear-shaped or irregular shape. In the case of leisure boats for instance, it is sometimes desired to attach articles to the pulpit of the boat or vessel, or to the guard rail supports or stanchions attached thereto. This applies to both the horizontal and vertical parts of the pulpite and also to other parts thereof. For instance, it is sometimes desired to attach to the pulpit a flag pole holder. Similarly, there is a need in shops which sell wearing apparel to attach elements to tubular stands from which clothes, garments, etc. are normally hung. It is also necessary to be able to connect the tubular members of tubular stands and like structures together when erecting such stands.

To such ends there have been proposed fastener devices which include a conical sleeve or socket which is locked firmly with the aid of conical wedge means. One such device is disclosed in GB 1 241 455. It consists of a conical outer sleeve and an inner sleeve comprising a ring with protruding strip-like axially directed conical wedge means and is intended to be mounted at an arbitrary position on a round shaft. One drawback with fastener devices of this kind is that the sleeve must be fitted from one end of the rod or tubular member, which is not always possible or desirable. In the device of GB 1 241 455 the outer sleeve may have a narrow axial slot, but said outer sleeve is so rigid that it is not possible to widen it so much that it can slip off the shaft side-ways. Furthermore, the wedge means of the inner sleeve exhibit protrusions at their ends such that the outer sleeve can not be removed from the inner sleeve, when the device is mounted an a shaft.

Consequently, in order to enable attachements to be fitted from the side of the rod or tubular member, there have been proposed devices in which a sleeve is provided with an axially extending side opening and a screw for clamping the sleeve in position. One drawback with devices of this kind is that they are unnecessarily bulky and the outwardly projecting screws present obstacles on which things can be caught and snagged. Furthermore, such clamping screws will either afford a poor attachment, with the risk of the sleeve sliding along the rod or tubular member, or will dig into the rod or tubular member and cause indents, scratches and/or outwardly projecting burrs thereon, which cannot always be accepted.

U.S. Pat. No. 2 136 861 describes a fastening device intended to be mounted on the end of a pump-rod for an oil well. It comprises an outer sleeve or body with a tapered bore and a longitudinal slot and a tapered split sleeve with a wedge-shaped rib opposite its slot and an annular groove for a lock ring at its reduced end. The split inner sleeve exhibits a substantially U-shaped opening or slot with a circular bottom portion and tangentially adjoining substantially parallel or slightly diverging sides. The outer sleeve exhibits at its wide end a yoke for connection to a pump jack or similar device. The inner sleeve is obviously made of metal or some other material which is only slightly elastic in order to be able to take up the great forces applied in oil pumping.

For mounting of the device, the inner sleeve is first positioned on the end of a pump rod with an enlargement at said end and then the outer sleeve is laterally adapted to the rod and moved endwise thereof to bring the inner sleeve in seating engagement with the bore, the rib of the inner sleeve being keyed in the slot of the outer sleeve, for example, the slots of the sleeves will be positioned opposite each other. A lock ring is then placed in the groove of the inner sleeve to prevent the two sleeves from moving apart.

The angle of contact between the inner sleeve and the pump rod is only about 180°. Because of this no positive positioning of the rod can be accomplished, but it can be positioned in various inclined or a-tilt positions within the slot or opening of the inner sleeve. Furthermore, in the device of U.S. Pat. No. 2 136 861 the sleeves are not held together by friction forces in mounted position, but the lock ring described above must be used to keep it together. In addition, the device can not be mounted in an arbitrary position on a cylindrical object but only in abutment with a laterally protruding enlargement thereon.

Other examples of areas in which it may be desired to attach articles to rod-like or tubular supports include road work, building work and the winter storage of leisure boats, where it is sometimes desired to attach a tarpaulin to the tubular members of the tarpaulin support frame. At present, the eyelets provided along the sides of the tarpaulin are used to this end. This method, however, leaves large areas of the tarpaulin unsecured and does not enable the tarpaulin to be tensioned satisfactorily, and consequently large surface areas of the tarpaulin are left free to move under the influence of wind. When the wind blows, the tarpaulin will thus bulge inwardly and outwardly within the confines of its attachment points, in other words a given point on the tarpaulin is able to move through some distance before being brought to a halt. The larger the free surface area, the longer the aforesaid distance and the greater the braking force on the tarpaulin, i.e. the higher the stresses generated on the eyelets and the tarpaulin material.

Consequently, constructions have been proposed which lack the provision of eyelets and which enable the tarpaulin to be stretched more rigidly so as to leave much smaller, freely movable surfaces and therewith reduce the wear and tear on the tarpaulin fabric. CH 599 747 teaches an attachment device made of an elastic or resilient material and intended for attaching fabric cloth to a cylindrical rod. This known device comprises two mutually opposing legs and an intermediate web, said legs having a springiness which allows the legs to be forced apart and to spring back when said force is removed. The device is intended to be forced down over a fabric cloth and an underlying rod, so as to peg the cloth to the rod. Located on the web of the device is a ring which facilitates removal of the device and which enables the device to be secured with a cord, for instance on an anchoring element mounted on one end of the rod.

One drawback with this known fastener device is that its fastening ability is limited by the elasticity of the device and the fastener is readily dislodged when subjected to powerful forces, e.g. strong winds. Furthermore, the known fastener device cannot be used to anchor a fabric drape stand with the aid of bracing wires. Such wires have a tendency to pull the fastener devices loose when subjected to tension. The known fastener device is also made of a polymeric material. All polymeric materials tend to age to a greater or lesser extent with time, and will sooner or later lose their mechanical strength, so as to break or loosen under very small tension forces or strain.

It is also known to secure a fabric cloth, by caulking the cloth firmly in a channel or groove with the aid of some suitable matter or elongated rubber strips. An example of this method is found described and illustrated in DE 2 547 599, which teaches a hollow profile of round or triangular cross-section which has an axially extending opening into which two edges of a cloth are intended to be inserted and there caulked securely with the aid of an elastic or resilient member, e.g. a soft rubber profile, such as to produce a joint connection.

One drawback with fastener devices of this kind is that the task of caulking the rubber profile or like means into said channel is both time consuming and difficult to achieve, inter alia because it must be inserted along the whole length of the channel. Removal of the rubber profile or like means from the channel, for the purpose of detaching the fastener device, can also be difficult and may even be hazardous to the cloth. This drawback is particularly manifest when the profile has aged and begun to disintegrate.

SUMMARY OF THE INVENTION

One object of the invention is therefore to provide an improved device of the aforementioned kind which is intended to be applied externally to a cylindrical object, which is not encumbered with the aforesaid drawbacks, which can be fitted and removed quickly and easily, which has an uncomplicated construction and can be readily manufactured at low costs.

A further object of the invention is to provide a fabric cloth fastening device which will enable the cloth to be secured reliably to a cylindrical object and to remain secured even when the cloth or the actual device is subjected to strong tension forces, and which will ensure reliable attachement of the cloth after a long period of use, irrespective of any aging of the polymeric material from which the device is made. A further object in this respect is to provide a fastener device which can be removed from the cylindrical object with fabric material seated thereon, without risk of damage.

A further object of the invention is to provide a fastener device for securing, e.g., a fabric cloth to a tubular stand, said device also including means for attaching bracing wires to such a cloth-draped stand.

These objects are achieved by means of the device according to the invention which is characterized in that the internal tubular member is made of an elastic material with high friction; that, in unaffected or unloaded condition, the longitudinally extending opening of said member has a smaller width than the smallest width of the cylindrical object; and that the angle of contact of the internal tubular member against the surface of the cylindrical object in mounted position exceeds 180°.

A favourable embodiment of the invention is characterized in that the longitudinally extending opening of the internal tubular member and longitudinally extending opening of the external tubular member are coinciding, when the device is mounted on said cylindrical object.

When securing fabric cloth, for instance a tarpaulin, with the aid of the inventive device, it is possible to clamp firmly any part of the tarpaulin whatsoever along, for instance, a tubular member, therewith obviating the dependency on attachment at those locations at which the permanent eyelets are situated. Similarly, the device can be used as an eyelet, which can also be placed at any selected position on the tarpaulin and equally as easily detached therefrom and moved to another location on the tarpaulin. When the inventive device is used as an eyelet, the rod-like member or tubular member used in conjunction therewith will suitably have a length which is adapted to the length of the internal and external tubular part.

A fastener device constructed in accordance with the invention and having an outer metal part and an inner part made of a polymeric material will provide positive attachment, even should the polymeric material age and crack or likewise disintegrate, while still enabling the device to be readily dismantled without risk of damage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in more detail with reference to a number of non-limiting exemplifying embodiments thereof and with reference to the accompanying drawings, in which FIG. 1 illustrates an inventive device clamped firmly around a cloth and a circular-cylindrical object;

FIG. 2 is a longitudinal sectional view of the device illustrated in FIG. 1;

FIG. 9 is a side view of an altenative embodiment of the inventive device intended for attachment to the external surfaces of a square object;

FIG. 10 is a cross-sectional view of the device illustrated in FIG. 9, taken on the line 10—10.

DETAILED DESCRIPTION OF THE PREFERRED EMBODIMENTS

Figure 3:
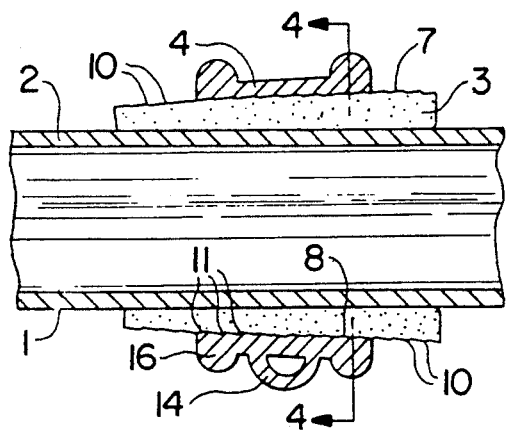
FIG. 3 is a longitudinal sectional view of an alternative embodiment of the inventive device.

A device intended for securing fabric cloth 1 securely to the outer surfaces of a circular-cylindrical object 2 will now be described in more detail with reference to FIGS. 1 and 2. The fastener device comprises an internal, tubular part 3 and an external, tubular part 4, the longitudinally extending openings 5 and 6 of each of which extend along the whole length of respective tubular members 3, 4. The internal tubular member 3 has a conical peripheral surface 7 and an inner diameter which coincides approximately with the outer diameter of the cylindrical object 2. The outer tubular part 4 has a conical inner surface 8, the conicity of which coincides approximately with the conicity of the peripheral surface 7 of the internal tubular member. The fabric cloth 1 can be clamped firmly between the internal tubular member 3 and the cylindrical object 2, by relative axial displacement of the external and internal tubular members 4 and 3 respectively.

The members 3, 4 can be loosened one from the other, and therewith also the fabric cloth 1, by moving the tubular members relative to one another in the opposite direction. The internal tubular member 3 is preferably made of an elastic or resilient material which exhibits a high degree of friction, for instance rubber or a soft plastics material. The external tubular member 4, on the other hand, should be rigid so as not to gape excessively when in its clamping position, and may be made, for instance, of metal or plastics material. In order to prevent relative displacement of the tubular members 3, 4 in their clamping positions, the external tubular member 4 may be provided with a hole 12 through which a locking pin 13 can be inserted. The length of the locking pin 13 will be sufficient to enable the pin to enter the internal tubular member 3 and therewith lock the members 3, 4 together. The opening 6 in the external tubular member 4 will suitably have a width 9 which is at least equal to the outer diameter of the cylindrical object 2. This will enable the external tubular member 4 to be fitted over the cylindrical object 2 at any location whatsoever therealong, therewith obviating the need of fitting said member from one end of the object 2. This will afford an obvious advantage when the cylindrical object 2 concerned is a long tube forming part of a tubular stand and having its ends connected to other stand components.

As illustrated in FIG. 1, the internal and external tubular members 3 and 4 of the inventive device can be provided with connecting means 15 effective in preventing said members from becoming separating from one another when not in use. The length of this connecting means will be such as to enable the members 3, 4 to be moved apart to an extent which will enable said members to be detached from or clamped firmly around the cloth 1 and the cylindrical object 2. This connecting means 15 may, for instance, be a length of cord which is attached at one end to the external tubular member 4 and at its other end to the internal tubular member 3.

Figure 4:
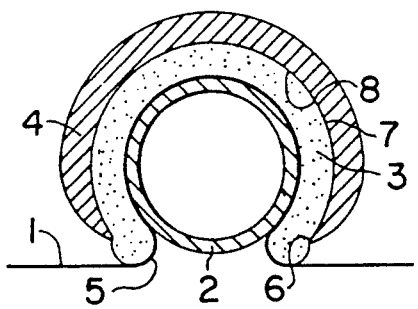
FIG. 4 is a cross-sectional view of the device illustrated in FIG. 3, taken on the line 4—4.

An alternative embodiment of the inventive device is illustrated in FIGS. 3 and 4. In the case of this embodiment, the peripheral surface 7 of the internal tubular member 3 is provided with sawteeth-like serrations 10. The conical inner surface 8 of the external tubular member 4 is similarly provided with sawteeth-like serrations 11 which co-act with the serrations 10 in a manner to lock the members 3 and 4 when occupying their clamping position. The external tubular member 4 is also provided with a lug 14 to which, for instance, a tarpaulin cord can be fastened. This enables the inventive device to be used for bracing purposes or as an eyelet, and the device can be readily moved to any selected location on the tarpaulin. In this case, the cylindrical object 2 should be somewhat longer than the internal tubular member 3.

In the case of the FIG. 3 embodiment, the external tubular member 4 is also provided with ridges 16, which are effective in stiffening the member 4 so as to render it more difficult for the member to gape when clamped firmly around the internal member 3, i.e. so that the opening in said member 4 cannot be widened. These ridges or ribs 16 also serve to enhance the grip when manipulating the external member for clamping purposes or to separate the members 3 and 4. As will be seen from FIG. 4, the edges of the opening 5 of the internal member 3 are advantageously rounded so as to reduce possible damage to the cloth.

As an alternative method of manufacture, the internal and external tubular members 3 and 4 may be cast from a plastics material, and then preferably from mutually different plastics material, so that said members will obtain mutually different properties, as earlier mentioned. The members 3 and 4 may be cast or moulded so as to form the connecting means 15 simultaneously therebetween. The internal tubular member 3 may also be moulded in a manner such as to obtain greater elastic properties in the region thereof located nearest the cloth 1 and more rigid properties in the region thereof nearest the external tubular member 4, or may be produced from two mutually different materials having mutually different degrees of hardness on the outside and inside.

The angle formed by the mutually locking surfaces of an inventive device with the surface of the tubular or rod-like object is of great significance. The most suitable angle can vary in dependence on the composition of the material in the external and the internal tubular members. When the external tubular part is made of metal and the inner tubular part is made of plastics, e.g. polyurethane, particularly favourable clamping conditions are obtained at an angle of 2.5°-3.5°, especially about 3°. At an angle of 2° or less, it is difficult to separate one member from the other when wishing to remove the device. At an angle of 4.0° or thereabove, the two members will loosen readily from one another and it then becomes necessary to provide the members with barbs 10, 11, in the manner illustrated in FIG. 3.

The inventive device has the following modus operandi. When wishing to secure a cloth 1 onto a cylindrical object 2, the internal tubular member 3 is first fitted over the cloth 1, which in turn surrounds the cylindrical object 2, by widening the opening 5 of the member 3. The external tubular member 4 is then fitted over the cloth 1, and the cylindrical object 2, through the agency of the opening 6 in said member 4. The external member is fitted at a location remote from the internal tubular member 3. The external tubular member 4 is then moved towards and over the internal tubular member 3, until desired clamping of the cloth 1 is achieved. The members 3 and 4 can then be locked together with the aid of a locking pin 13, or alternatively such locking is achieved automatically, optionally with the aid of the serrations 10 and 11. The reverse procedure is undertaken when wishing to loosen or remove the device.

Figure 5:
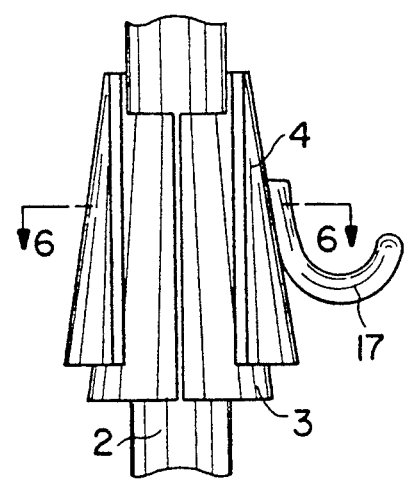
FIG. 5 is an alternative embodiment of the device, which includes a hook for hanging purposes.
Figure 6:
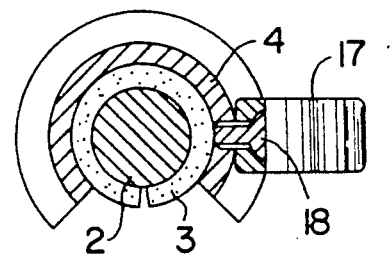
FIG. 6 is a cross-sectional view of the device illustrated in FIG. 5, taken on the line 6—6.

FIGS. 5 and 6 illustrate the use of the inventive device for securing elements to a cylindrical object without simultaneously clamping a fabric cloth thereto. Similarly to the aforedescribed device, the device of FIGS. 5 and 6 includes an internal tubular member 3 and an external tubular member 4. The difference in this case is that the external tubular member 4 of the FIGS. 5 and 6 embodiment is provided with a hook 17 on which different objects can be hung. In this case, the hook 17 is a separate part which is attached to the external tubular member 4 by means of a screw 18. The screw extends through the hook 17 and is screwed into a hole in the outer tubular member 4. The depth of the hole and the screw 18 may have a length such as to ensure that the screw will enter the internal tubular member 3 and therewith lock the external and internal tubular members 3, 4 together. Naturally, the hook 17 may, instead, be an integral part of the outer tubular member 4, in a manner similar to the lug 14 of the FIG. 3 embodiment.

The hook can be replaced with other attachment devices, for example a lamp bracket, a flower pot holder, a lug, a U-shaped or ring-shaped support bracket for, e.g., a clothes rod etc. The clothes rod will then rest in the U or is inserted into the ring. In order to prevent the clothes rod from sliding in its axial direction, the rod can be locked with the aid of a screw which passes through the U or the ring and then into the rod. Alternatively, the U or the ring can be provided with a vertically extending wall which forms a rod stop located slightly within the U or the ring.

Figure 7:
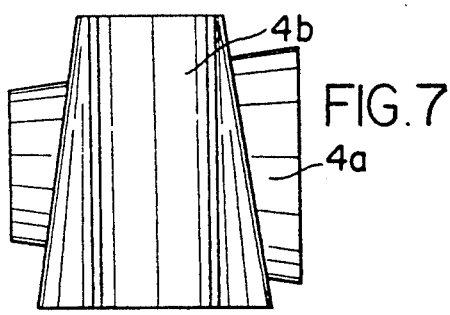
FIGS. 7 and 8 are respectively two views of two mutually connected outer, tubular parts in accordance with the invention, these parts together forming a tie or cross coupling for tubular stands for example.
Figure 8:
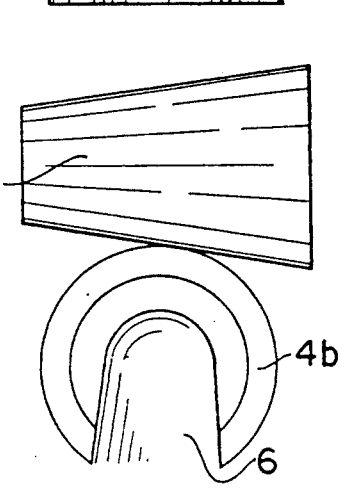

As illustrated in FIGS. 7 and 8, a further external tubular member 4b can be attached to the external tubular member 4a, instead of the hook 17. The two tubular members 4a, 4b can be bolted or welded together, or mutually secured in some other suitable manner, at a suitable angle from 0° to 360°. In use, each external tubular member will be provided with a respective intenal tubular member 3, in the aforedescribed manner. It is thereby possible, for instance, to construct tubular stands and frame structures with the aid of said tubular members, these members forming cross-tie connections between the various tubes of the stand. These couplings can be used, for instance, in the erection of clothes racks in shops and the like, erection of scaffolding and the like.

FIGS. 9 and 10 illustrate a device which is adapted for attachment to an elongated object 2c of square cross section. Naturally, in this case the internal and external tubular members 3c, 4c will also have a square cross-sectional shape. The external tubular part 4c may be provided with an attachment plate 19 provided with holes 20 in which other elements can be attached. Similarly to the proceeding embodiments, the internal tubular part 3c has wedge-shaped axially extending section surfaces and the inner surface of the external tubular member will subtend the same angle with its longitudinal axis as the outer surface of the internal tubular member subtends with its longitudinal axis.

In each of the aforedescribed embodiments, the longitudinally extending openings or slots 5, 6 of the internal and external tubular members 3, 4 coincide. When the device is used for suspension means and not for clamping a cloth to an elongated object, the parts 3, 4 may, however, be positioned in any desired manner relatively to one another, for instance such that the side opposite the opening 5 of the internal member 3 will cover the opening 6 of the external member 4.

Figure 11:
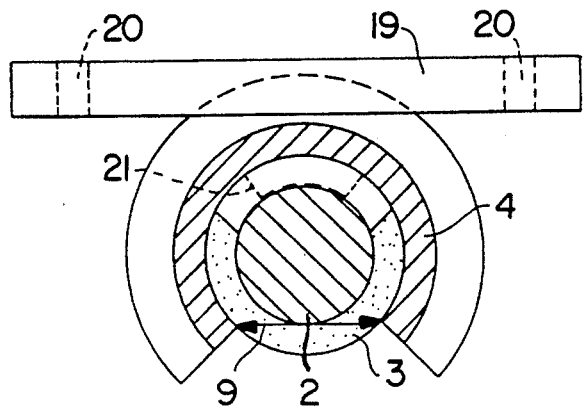
FIG. 11 illustrates an altenative embodiment intended for attachment to a wall structure.

The inventive device may also be used as a suspension fitting for, e.g., mounting a pipe onto a wall, in the manner illustrated in FIG. 11. In this case, the external tubular member 4 is provided with an attachment plate 19 and the internal tubular member 3 is fitted so as to cover the opening 6. The internal member will suitably comprise a hard plastic material or will be made of a metal which is more elastic or more readily deformed than the external member 4, so that it can be knocked into a locking position while preferably being bent simultaneously to a certain extent in order to obtain an increased embracing angle. The part of the external member 4 located opposite the opening 6 may be provided with an inwardly projecting shoulder 21, in the manner shown in broken lines, having an axial-parallel inwardly turned surface intended to form an abutment surface for a rod or a tube 2 attached to the wall-mounted device.

In the aforegoing, devices have been described which are intended for attachment to a circular-cylindrical object or an object of square cross-section. It will be understood, however, that the cross-sectional shape of the object may equally as well be triangular, pentagonal, hexagonal and up to multi-sided cross-sections, and also of irregular cylindrical shape. All that is required in such cases is to adapt the shape of the internal and the external tubular members to the cross-sectional shape of the object concerned. For instance, the inventive device can even be used with different types of beams, such as I-beams and U-beams, and for different profile shapes extruded in aluminium.

Neither is it necessary in the case of an internal tubular member having a cornered cross-sectional shape, for instance a square shape, for all four sides of the component to have wedge-shaped longitudinal section surfaces. If desired, only one side, for instance, may be given a wedge-shaped cross-sectional surface while the remaining sides have rectangular cross-sectional surfaces. Of course, this will impair the gripping action against the tubular or rod-like object. In the case of an inventive device provided with an attachment plate 19, the distance between the object 2 and the abutment surface of the attachment plate 19 will be constant and precisely defined when the parts of the members 3, 4 located nearest the plate are rectangular, i.e. axially parallel with the cylindrical object 2.

Similarly, a screw or bolt can be used instead of the locking pin 13. If a bolt is used, it may be necessary to provide the internal tubular member 3 with a hole. The provision of a hole is not necessary when using the locking pin 13 or the screw, since these elements are so pointed as to be self-penetrating into the internal tubular member 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device fitted externally to a rod-like object comprising an internal tubular member and an outer, rigid, tubular member, both the internal and external tubular members having a longitudinally extending opening extending along an entire length thereof, the rod-like object being insertable into and removable from the internal and outer tubular members through the longitudinally extending openings;

the internal tubular member having a generally smooth outer peripheral surface in cross section with a circumference at least partially decreasing in one longitudinal direction and having a generally smooth internal surface in cross section with a shape corresponding approximately to a shape of the rod-like object, the internal tubular member being an elastic material having high friction, the longitudinally extending opening in the internal tubular member having a smaller width than a smallest width of the rod-like object when the internal tubular member is in an unloaded condition, and an angle of contact of the internal tubular member against the rod-like object in a mounted position exceeds 180°;

the outer tubular member having an internal surface which abuts with the outer peripheral surface of the internal tubular member and which has a circumference correspondingly decreasing in the one longitudinal direction as the outer peripheral surface of the internal tubular member, the internal tubular member and outer tubular member being fit over the rod like-object and axially displaced towards one another until an inner surface of the internal member lockingly presses against the rod-like object, the internal and outer tubular members being locatable at an arbitrary position along the rod-like object.

2. The device according to claim 1, wherein the outer peripheral surface of the internal tubular member and the internal surface of the outer tubular member taper one of conically and pyramidally to thereby have the at least partially decreasing circumference, the rod-like object having a generally central, longitudinal axis and tapering surfaces of the internal and outer tubular members form an angle of 2° to 4° with the generally center axis.

3. The device according to claim 2, wherein the angle is between 2.5° and 3.5°.

4. The device according to claim 3, wherein the angle is generally 3°.

5. The device according to claim 1, wherein the longitudinally extending openings of the internal tubular member and outer tubular member generally coincide when the device is mounted on the rod-like object.

6. The device according to claim 1, wherein the longitudinally extending opening of the outer tubular member has a width which is at least equally as large as the smallest width of the rod-like object.

7. The device according to claim 1, wherein the outer peripheral surface of the internal tubular member and the internal surface of the outer tubular member both have saw-tooth serrations thereon which co-act to mutually lock the internal tubular member and outer tubular member when in contact with one another to at least prevent movement in one longitudinal direction.

8. The device according to claim 1, wherein the outer tubular member has a through-hole defined therein and further comprising a locking pin insertable into the through-hole and into the internal tubular member to mutually lock the internal tubular member and the outer tubular member in respective fastening positions.

9. The device according to claim 8, wherein the locking pin protrudes above the outer tubular member when inserted into the through-hole, the locking pin being slid into and out of the through-hole.

10. The device according to claim 1, further comprising at least one attachment means for operatively connecting the device to one of a line, lines, an article and articles.

11. The device according to claim 10, wherein the attachment means comprises one of a lug, a hook and an attachment plate.

12. The device according to claim 10, wherein the attachment means comprises a lug attached to an outer surface of the outer tubular member.

13. The device according to claim 10, wherein the attachment means comprises a J-shaped hook attached to an outer surface of the outer tubular member.

14. The device according to claim 10, wherein the attachment means comprises an attachment plate attached to an outer surface of the outer tubular member, the attachment plate having means for affixing the device to a wall and the outer tubular member having an inwardly projecting shoulder on the internal surface thereof, said shoulder extending through a longitudinally extending opening of the internal tubular member and engaging the rod-like object when the device is mounted on the rod-like object.

15. The device according to claim 1, further comprising a flexible means for connecting the internal tubular member and the outer tubular member.

16. The device according to claim 1, further comprising a second outer tubular member affixed to the tubular member which is a first tubular member, the second outer tubular member having a longitudinal axis which is nonaligned with a longitudinal axis of the first tubular member, and the first and second outer tubular members coupling two rod-like objects insertable therein.

17. The device according to claim 1, wherein a cloth is positioned between the rod-like object and the internal tubular object without a need to form holes in the cloth, the cloth being held in position on the rod-like object by the device when the outer tubular member and internal tubular member are fit over the cloth and axially displaced relative to one another to thereby lockingly press the cloth against the rod-like object.

18. The device according to claim 17, wherein the rod-like object is one of a stand and frame structure and wherein the rod-like object is insertable into the device through the longitudinally extending openings of the internal tubular member and the outer tubular member.

* * * * *